April 22, 1952 — A. L. MEIS — 2,593,781

TREE PROTECTOR BAND

Filed May 5, 1945

INVENTOR

ALFRED L. MEIS

ATTORNEY

Patented Apr. 22, 1952

2,593,781

UNITED STATES PATENT OFFICE 2,593,781

TREE PROTECTOR BAND

Alfred L. Meis, St. Paul, Minn.

Application May 5, 1945, Serial No. 592,124

2 Claims. (Cl. 43—108)

My invention relates to a tree protector band or tree saver in the form of a band of steel wool which is treated or impregnated with a tacky non-drying material, so that creeping insects will be caught and destroyed as they creep up the trunk of a tree thus protecting the leaves and upper portion of the tree.

The band may consist of rust proofing steel wool of approximately one-quarter inch thick by four inches wide and on the surface of which a coat of tacky material approximately one-sixteenth of an inch thick is applied, or the steel wool may be impregnated with the tacky material. The material of the protector band may be made of spun glass, sponge rubber, wool felt cloth, or such material as used for insulation in buildings and known by such trade names as "Rock Wool" or "Balsam Wool."

A feature resides in providing a band which may be easily attached to a tree, extending around the tree trunk and having a tacky outer surface for catching insects which endeavor to crawl up the trunk of the tree. The protector band is formed on one end with a cardboard or a thin wood member which is adapted to be attached by staples to the end of the band. This cardboard member is perforated transversely of the band at the end thereof so that a portion of the cardboard may be removed and used as a paddle or stick to force the material of the band into the crevices of the bark to cause the band to closely adhere to the tree.

The other end of the band is provided with clips for attaching the same to the end of the band which supports the cardboard binder. I also provide extending through the cardboard binder at one end of the band one or more tacks, which are used to attach one end of the band to the bark of the tree while the body of the band is being wrapped around the tree. The tacks act as a means of holding the band until it is wrapped completely around the tree. When the band is wrapped around the tree the clips will hold the overlapping ends of the same to securely support the band around the tree.

It is also a feature to provide a tree saver or protector band which is formed with strips of cotton or "Balsam Wool" or similar material extending marginally and longitudinally of the band. The strips act as soft pliable means of entering into the crevices of the bark along each side of the band to close any openings between the band and the bark of the tree and thereby causing any creeping insects to be forced to come into contact with an outer tacky surface of the band which captures the insects, holding them fast and destroying them.

My tree saver band provides a simple method of wrapping a tacky substance around shade and fruit trees to catch creeping insects that ordinarily destroy the trees by eating the leaves or attacking the fruit. This method will save permanently marring the bark of the tree by eliminating the deep scraping off of the bark (which may kill the tree). It has been the common custom heretofore to smooth the bark in order to apply a tacky substance thereto. It is an important feature of my invention to provide a removable tree saver band or protector which may be removed after the danger of insects is over and leaving the tree free of any permanent marks or injury to the bark, furthermore the easy way in which my tree protector may be attacted around the trunk of the tree will save labor and time in applying or removing my tree protector band.

These features together with other suggestions and details will be more clearly and fully set forth in the following specification and claims.

In the drawings forming a part of this application:

Figure 1:
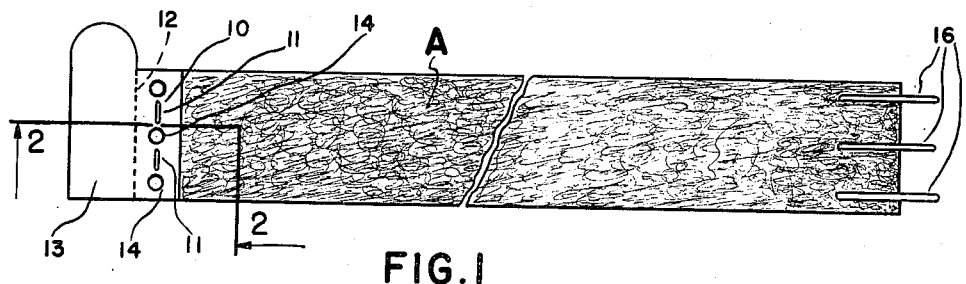
Figure 1 is a side view of my tree protector band a portion of which is broken away.
Figures 2, 3, 4:
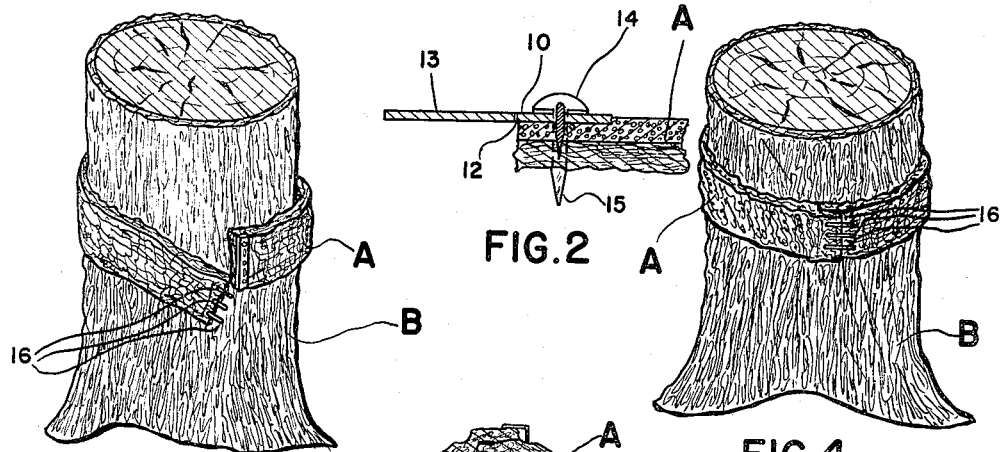
Figure 2 is a section on the line 2—2.
Figure 3 illustrates a tree trunk showing my protector band in the course of being attached around the tree.
Figure 4 illustrates a tree trunk with a band extending around the trunk with the ends overlapping and the clips holding the overlapping upper end of the band in place.
Figure 6:
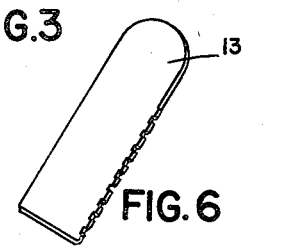
Figure 6 illustrates the paddle or stick removed from the end of the band.
Figure 5:
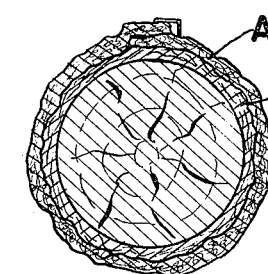
Figure 5 is a section through the trunk of the tree showing the band wrapped around the same.

My tree protector band A may be made of any suitable substance such as steel wool, sponge rubber, spun glass, "Balsam Wool," or wool felt cloth.

To one end of the band I provide a transverse strip 10 which is secured by the staples 11 to anchor the strip firmly to the extreme end of the band A. The strip 10 is of sufficient width to project beyond the end of the body of the band A and is perforated at 12 so that the portion 13 may be removed and used as a stick or paddle to press the body of the band A into the crevices of the bark of the tree as the band is applied around the tree.

The strip 10 may be made of cardboard or thin wood. I provide tacks 14 which extend through the strip 10 and the sharp end 15 of the tack projects beyond the body A so that the tacks 14 may be used to hold the band A at one end of the bark of the tree while the band A is being applied. The tacks 14 are anchored to the strip 10 and the band A and are inserted fully into the tree after the band has been correctly positioned.

The free end of the band A is provided with a series of clips 16 which are used to secure the overlapping ends of the band together thus to support the band wrapped firmly around the bark of the tree.

In the drawings I have shown a tree trunk B to expedite the illustration of the use and application of my tree protector or saver band.

Figures 7, 8, 9, 10, 11:
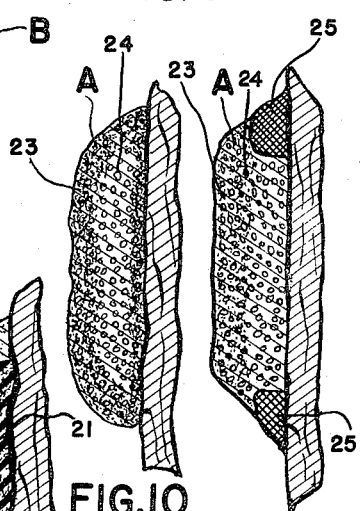
Figure 7 is a sectional detail of a portion of the bark of a tree showing one form (spun glass) of by band, secured to the same.
Figure 8 is a section of the bark of the tree showing another form of my band (wool fabric) attached to the bark of the tree.
Figure 9 is a section through the sponge rubber body of my tree protector band and showing the same attached to the bark of a tree.
Figure 10 is similar to Figure 9 showing the body of the band made of steel wool and the outer surface treated with a tacky non-drying adhesive.
Figure 11 is a similar section to Figure 10 showing the entire body of steel wool impregnated with a tacky adhesive and also showing marginal strips extending longitudinally of the band on the under surface so as to contact or fill in next to the bark of the tree.

In the form of my band A illustrated in Figure 7 the body 17 of the band may be made of spun glass or similar material and on the outer surface of this band I provide a tacky non-drying adhesive surface 18 which acts to catch any insects endeavoring to crawl up the tree. In the form of my band A illustrated in Figure 8 the body 19 of band A may be made of wool fabric and over the outer surface of the same I provide a layer 20 of tacky or non-drying adhesive for catching the insects.

In the construction of my band A illustrated in Figure 9 the body 21 is formed of sponge rubber while the outer surface is covered with a tacky adhesive 22.

In the construction of my bands A illustrated in Figures 10 and 11 the body 24 is made of steel wool. In the form in Figure 10 just the outer surface of the steel wool is covered with a tacky adhesive 23 while in the construction of band A in Figure 11 the entire body 24 is impregnated with a tacky material. In the construction of Figure 11 I also provide marginal filler strips 25 along both of the longitudinal sides of band A.

The strips 25 may be made of cotton, "Balsam Wool" or any soft material which will readily pack into the crevises of the bark of the tree, and which are secured to the body 24 by means of the tacky substance thereon and in addition by staples or clips of a suitable nature.

It is of primary importance in my invention to provide a removable tree protector band which can be quickly and easily attached to the trunk of a tree and just as easily removed. Heretofore trees have been treated with a tacky material by scraping an annular groove in the bark of the tree and then applying the tacky adhesive in the groove. Unless this work as done heretofore is carried out by a tree expert, the tree may be permanently injured and in fact the tree may be killed.

When the tree protector band is used there is no danger of injury to the tree. An inexperienced person may apply the same virtually as well as an expert and the tree is not damaged or marked because my tree saver band may be removed anytime. The time saved in applying the tree saver band is an important factor because it may be attached so easily and with little or no effort on the part of the operator as compared to the old method.

I claim:

1. A flat tree protector band comprising a body formed of steel wool impregnated with a tacky non-drying adhesive, a strip attached to one end of said body, tacks supported by said strip to attach the end of the band to the bark of a tree, a detachable paddle formed on said strip for forcing the body of said band into the crevices of the bark, and clips for securing the free end of the band to the attached end to form an annular tacky band around the tree trunk.

2. A tree protector comprising a flat band of tacky material adapted to be wrapped around the trunk of a tree, a transverse strip secured to one of said band, said strip having a detachable paddle formed thereon, tacks carried by said strip for attaching the end of the band to the bark of a tree and clip means for securing the free end of the band to the strip end.

ALFRED L. MEIS.

REFERENCES CITED

The following references are of record in the file of this patent:

UNITED STATES PATENTS

| Number | Name | Date |
| --- | --- | --- |
| 206,619 | Ruhlmann | July 30, 1878 |
| 1,293,563 | Siegler | Feb. 4, 1919 |
| 1,345,690 | Perl | July 6, 1920 |
| 2,011,405 | Giliasso | Aug. 13, 1935 |
| 2,022,937 | Kirkpatrick | Dec. 3, 1935 |
| 2,170,822 | Kirkpatrick | Aug. 29, 1939 |